United States Patent
Zeng et al.

(10) Patent No.: US 11,124,655 B2
(45) Date of Patent: Sep. 21, 2021

(54) SURFACE-MODIFIED PIGMENT PARTICLES FOR ELECTROPHORETIC DISPLAY AND ELECTROPHORETIC DISPLAY DEVICE

(71) Applicant: GUANGZHOU OED TECHNOLOGIES, INC., Guangzhou (CN)

(72) Inventors: Xi Zeng, Guangzhou (CN); Yu Chen, Guangzhou (CN)

(73) Assignee: Guangzhou OED Technologies, INC., Guangzhou (CN)

( * ) Notice: Subject to any disclaimer, the term of this patent is extended or adjusted under 35 U.S.C. 154(b) by 0 days.

(21) Appl. No.: 16/649,043

(22) PCT Filed: Aug. 24, 2018

(86) PCT No.: PCT/CN2018/102283
§ 371 (c)(1),
(2) Date: Apr. 20, 2020

(87) PCT Pub. No.: WO2019/056915
PCT Pub. Date: Mar. 28, 2019

(65) Prior Publication Data
US 2020/0255670 A1    Aug. 13, 2020

(30) Foreign Application Priority Data
Sep. 20, 2017   (CN) .......................... 201710854272.1

(51) Int. Cl.
C09C 3/10      (2006.01)
G02F 1/167     (2019.01)
C08F 292/00    (2006.01)

(52) U.S. Cl.
CPC .............. *C09C 3/10* (2013.01); *C08F 292/00* (2013.01); *G02F 1/167* (2013.01); *C01P 2004/62* (2013.01); *C01P 2006/12* (2013.01); *C01P 2006/60* (2013.01)

(58) Field of Classification Search
CPC .......... C09C 3/10; C08F 292/00; G02F 1/167; C01P 2004/62; C01P 2006/12; C01P 2006/60
See application file for complete search history.

(56) References Cited

U.S. PATENT DOCUMENTS

| | | | |
|---|---|---|---|
| 6,822,782 B2 | 11/2004 | Honeyman et al. | |
| 7,002,728 B2 | 2/2006 | Pullen et al. | |
| 7,230,750 B2 | 6/2007 | Whitesides et al. | |
| 7,247,379 B2 | 7/2007 | Pullen et al. | |
| 8,270,064 B2 | 9/2012 | Feick et al. | |
| 8,582,196 B2 | 11/2013 | Walls et al. | |
| 8,654,436 B1 | 2/2014 | Feick | |
| 8,961,831 B2 | 2/2015 | Du et al. | |
| 9,382,427 B2 | 7/2016 | Du et al. | |
| 9,428,649 B2 | 8/2016 | Li et al. | |
| 2005/0270628 A1* | 12/2005 | Miyazaki | B01J 13/14 359/296 |
| 2010/0289736 A1* | 11/2010 | Feick | C09C 1/34 345/107 |
| 2012/0229885 A1* | 9/2012 | Chen | G02F 1/167 359/296 |
| 2014/0339480 A1 | 11/2014 | Hui et al. | |
| 2015/0177590 A1 | 6/2015 | Laxton | |

FOREIGN PATENT DOCUMENTS

| | | |
|---|---|---|
| CN | 101082752 A | 12/2007 |
| CN | 102181022 A | 9/2011 |
| CN | 102430370 A | 5/2012 |
| CN | 102443284 A | 5/2012 |
| CN | 102640043 A | 8/2012 |
| CN | 103193916 A | 7/2013 |
| CN | 103525133 A | 1/2014 |
| CN | 104073023 A | 10/2014 |
| CN | 104140691 A | 11/2014 |
| CN | 104204932 A | 12/2014 |
| CN | 105700265 A | 6/2016 |
| CN | 105807532 A | 7/2016 |
| CN | 107312391 A | 11/2017 |
| CN | 108059852 A | 5/2018 |
| CN | 207457664 U | 6/2018 |
| CN | 108279543 A | 7/2018 |

OTHER PUBLICATIONS

Jingjing Li et al: "Preparation and characterization of TiO-cationic hybrid nanoparticles as electrophoretic particles", Applied Surface Science, Elsevier, Amsterdam, NL, vol. 258, No. 7, Nov. 10, 2011 (Nov. 10, 2011), pp. 3152-3157.

* cited by examiner

*Primary Examiner* — Bijan Ahvazi
(74) *Attorney, Agent, or Firm* — Treasure IP Group, LLC

(57) ABSTRACT

The invention provides pigment particles and an organic modification layer formed on a surface of the pigment particles; the organic modification layer is a surfactant layer or a polymer material layer formed on the surface of the pigment particles; an organic matter content over the specific surface area $W_{surf}$ of the pigment particles is in a range of 0.1-2% g/m². The surface-modified pigment particles provided by the invention have good stability, and the electrophoretic display prepared by using the surface-modified pigment particles of the invention has good optical performance.

8 Claims, No Drawings

SURFACE-MODIFIED PIGMENT PARTICLES FOR ELECTROPHORETIC DISPLAY AND ELECTROPHORETIC DISPLAY DEVICE

CROSS REFERENCE TO RELATED APPLICATION

This application claims priority to a PCT application PCT/CN2018/102283, filed on 2018 Aug. 24, which in turn claims priority to a Chinese Application No. 201710854272.1, filed on 2017 Sep. 20. The PCT and Chinese Applications are incorporated herein by reference in their entireties.

FIELD OF THE INVENTION

The invention relates to an electrophoretic display technology field, and more particularly to surface-modified pigment particles for an electrophoretic display and an electrophoretic display device.

BACKGROUND OF THE INVENTION

Electronic paper, a "thin, soft, rewritable display like paper", is becoming more widespread in everyday applications. The ways to realize electronic paper technology mainly include cholesterol liquid crystal display technology, electrophoretic display technology (EPD), and electrowetting display technology, but only electrophoretic display technology can achieve bistable and mass production. The principle of electrophoretic display is that in a liquid, different kinds of particles are dispersed, and the particles can be charged on the surface or neutral on the surface without charge. In the case of an external electric field, particles with a charge on the surface will move in a specific direction under the force of the electric field. For example, particles with a negative charge on the surface will move to the relatively high voltage side, and particles with a positive charge on the surface will move to the relatively low voltage side. Thus, particles with different surface charges are gathered in different positions in this system. By selecting particles and solvents of different colors, the effect of displaying different colors under different voltage conditions can be achieved.

For electrophoretic displays and related applications, their display performance and stability depend on the surface modification effect and stability of the black, white, or other colored particles used for display. Therefore, a pigment particle needs to be developed, which can increase the stability of the pigment particle in the solution, and can make the display have good photoelectric performance.

SUMMARY OF THE INVENTION

In view of the shortcomings of the prior art, the object of the invention is to provide surface-modified pigment particles and electrophoretic display units for electrophoretic display that have good optical properties in a solution.

In order to solve the above technical problems, the invention provides surface-modified pigment particles for an electrophoretic display, including pigment particles and an organic modification layer formed on the surface of each pigment particle; the organic modification layer is a surfactant layer or a polymer layer formed on the surface of each pigment particle; an organic matter content over the specific surface area $W_{surf}$ of the pigment particles is in a range of 0.1-2% g/m², the organic matter content $W_{surf}$ is expressed as that:

$$W_{surf} = \left(\frac{\text{Organic matter quality}}{\text{Pigment particle quality}}\right) / \text{Specific surface area of pigment particles.}$$

Preferably, the thickness of the organic modification layer is greater than 20 nm.

Preferably, the thickness of the organic modification layer is between 30 nm and 100 nm.

Preferably, the shape of the pigment particles is irregular.

Preferably, the average particle size of the pigment particles is in a range of 0.1 micrometer to 1 micrometer.

Preferably, the organic matter content $W_{surf}$ of the specific surface area of the pigment particles is further in the range of 0.25-1.6% g/m².

Preferably, the pigment particles are inorganic salts and/or inorganic oxide pigments.

Preferably, the organic modification layer is a surfactant layer or a polymer layer adsorbed on the surface of each pigment particle, or the organic surface-modification layer is a polymer layer grafted on the surface of each pigment particle.

The invention also provides an electrophoretic display device, which includes a body of the electrophoretic display device, an electrophoretic solution disposed in the body of the electrophoretic display device, and the surface-modified pigment particles described above.

Preferably, the body of the electrophoretic display device is a microcapsule, a microcup or a micropool.

The surface-modified pigment particles provided by the invention have good stability, and the electrophoretic display device prepared by using the surface-modified pigment particles of the invention has good optical performance.

DETAILED DESCRIPTION OF EMBODIMENTS

The technical solutions of the invention are described in further detail below with reference to the accompanying drawings and specific embodiments, so that those skilled in the art can better understand the invention and can implement it, but the examples given are not intended to limit the invention.

This embodiment provides surface-modified pigment particles for an electrophoretic display, including pigment particles and an organic surface-modification layer formed on the surface of each pigment particle; the organic surface-modification layer is a surfactant layer or a polymer material layer attached on the surface of each pigment particle; in electrophoretic display, there are many cases where two or more kinds of particles with different surface charges are present in one solution. At least two different kinds of particles have opposite surface charges. One kind of particle has a positive charge and the other kind of particle has a negative charge. There is also a strong electrostatic attraction between the two kinds of particles.

According to the DLVO theory of colloid chemistry, the van der Waals interaction force between two particles can be expressed by the following equation (References: Principles of Colloid and Surface Chemistry, third edition, by Paul C. Hiemenz and Raj Rajagopalan, Chapter 13):

$$\emptyset_{net} = 64 k_B T n_\infty \kappa^{-1} \Upsilon_0^2 \exp(-\kappa d) - \left(\frac{A}{12\pi}\right) d^{-2}$$

The calculated van der Waals force distance is generally less than 10 nm, and usually there is a weak attraction between the two particles at about 4-6 nm, which causes the two particles to attract each other and generates aggregates. In electrophoretic display, there are many cases where two or more kinds of particles with different surface charges are present in one solution. At least two different kinds of particles have opposite surface charges, one kind of particle has a positive charge and the other kind of particle has a negative charge. There is also a strong electrostatic attraction between these two kinds of particles. According to colloid theory, this electrostatic force can be expressed by the following equation (References: Principles of Colloid and Surface Chemistry, third edition, by Paul C. Hiemenz and Raj Rajagopalan, Chapter 11):

$$\emptyset_R = (4\pi R_s^2 \varepsilon \varphi_0^2) \exp(-\kappa S)/(S+2R_s)$$

The distance of electrostatic force will be a little longer than the distance of van der Waals force, generally above 10 nm, and can even reach 20-50 nm.

Based on the above analysis, it is desirable that the thickness of the organic modified layer on the surface of each particle be at least 20 nm, so that the distance between the two particles can be maintained at more than 40 nm. This can reduce the van der Waals force and electrostatic attraction between the particles, and increase the dispersion and stability of the particles in the electrophoretic display system.

Existing methods for measuring the thickness of the organic modified layer on the particle surface include TEM, SEM, dynamic light scattering, and static light scattering methods. However, these test methods are quite expensive, the test methods are more complicated, and the requirements for testers are relatively high. They require deep professional knowledge. Therefore, from this aspect, the better expression method is the organic content of the modified particles. At the same time, the average particle size and specific surface area of different pigment particles are considered to be very different. For example, when the average particle size of calcium carbonate particles is 1 micron, the specific surface area is usually in the range of 5-10 m$^2$/g; the specific surface area of fumed silica can be as high as 100 m$^2$/g or even 200-300 m$^2$/g. In this way, the same modified organic content causes a great difference in the thickness of the corresponding organic layer on different pigment particles. As a result, pigment particles modified with the same organic content have completely different properties in dispersion and stability in solution. Based on this consideration, the organic matter content over the specific surface area $W_{surf}$ of the pigment particles is a better characterization method.

In the present embodiment, the organic matter content over the specific surface area $W_{surf}$ of the pigment particles is in a range of 0.1-2% g/m$^2$, the organic matter content over the specific surface area. $W_{surf}$ is expressed as that:

$$W_{surf} = \left(\frac{\text{Organic matter quality}}{\text{Pigment particle quality}}\right) / \text{Specific surface area of pigment particles.}$$

On one hand, it is desirable that the polymer content over the specific surface area $W_{surf}$ is high enough so that the thickness of the polymer layer is large enough to isolate van der Waals forces and electrostatic attractive forces. However, on the other hand, if $W_{surf}$ is too high, the thickness of the polymer layer will be too large. When the pigment particles move under an external electric field, it will bring greater resistance and reduce the migration rate of the particles under the electric field. In this way, $W_{surf}$ needs to be in a suitable range, which can provide sufficient dispersion and stability for the pigment particles without seriously reducing the migration rate of the particles.

In a preferred embodiment, the organic matter content over the specific surface area $W_{surf}$ of the pigment particles is further in the range of 0.25-1.6% g/m$^2$.

In a preferred embodiment, the organic modification layer is an organic modification layer having a thickness greater than 20 nm. In a further preferred embodiment, the organic modification layer is further an organic modification layer having a thickness between 30 nm and 100 nm. In a further preferred embodiment, the organic modification layer is an organic modification layer having a thickness between 35 nm and 50 nm.

In a preferred embodiment, the shapes of pigment particles are irregular.

In a preferred embodiment, the average particle size of the pigment particles ranges from 0.1 micrometer to 1 micrometer. In order to achieve electrophoretic display, the average particle size of these pigment particles is usually relatively small. According to the principle of thermodynamics, such small particles will tend to aggregate together in the solvent instead of being uniformly dispersed in the solvent. The causes of particles agglomeration in solution include van der Waals force, electrostatic attraction (between two particles with opposite surface charges), and bridging effects caused by polymers in the solution. Therefore, the average particle size of the pigment particles in the range of 0.1 micrometers to 1 micrometer has a better display effect, and is not affected by the interaction force between the particles.

In a preferred embodiment, the pigment particles are pigment particles of an inorganic salt and/or an inorganic oxide pigment.

The inorganic salt and/or the inorganic oxide pigments include silica, titanium dioxide, calcium oxide, chromium oxide, zinc dioxide, copper oxide, lead oxide, carbon black, silicate, titanium yellow, chrome yellow, lead chrome green, manganese purple, iron blue, cobalt blue, zinc white, cadmium yellow, barium sulfate, molybdenum orange, ultramarine blue, azure blue, emerald green, emerald green, and other types of inorganic salt or inorganic oxide pigments.

In a preferred embodiment, the color selection of the pigment particles may be white, black, or other colors, such as red, yellow, blue, green, brown, and other colors.

In a preferred embodiment, the organic surface-modification layer is a surfactant layer or a polymer material layer adsorbed on the surface of each pigment particle, or the organic modification layer is a polymer layer grafted on the surface of each pigment particle. When modifying the particle surface, the method of adsorbing surfactants or polymers is relatively simple. But the adsorption of these organic substances is generally physically adsorbed on the particle surface, or chemical adsorption through ionic bonds, hydrogen bonds, and the like. However, these adsorptions are usually a reversible process, and the modification results of the particles do not have long-term stability, which affects the performance and long-term reliability of the electrophoretic display. Therefore, it is a better method to graft the polymer to the surface of the particle through covalent bonding, which can provide the particle a long-term surface modification.

In a further preferred embodiment, the grafting method is to perform a polymerization reaction with a polymer monomer in a solution; and at the same time, the synthesized polymer is then grafted with a coupling agent existing on the surface of the pigment particles. Common coupling agents include silane-based coupling agents, titanate-based coupling agents, aluminate-based coupling agents, and the like. The polymer monomer may be any compound that can be used for polymerization reaction, including but not limited to compounds such as octadecyl methacrylate, dodecyl methacrylate, tetradecyl methacrylate, ethyl methacrylate, butyl methacrylate, t-butyl methacrylate, cyclohexyl methacrylate, isobornyl methacrylate, benzyl methacrylate, styrene, 4-vinylpyridine, N-vinylpyrrolidone, trifluoroethyl methacrylate, methacrylic acid, or mixtures, composites or derivatives thereof.

In a preferred embodiment, the pigment particles are pigment particles of an organic pigment. Organic pigments include various natural or synthetic organic pigments. For example, organic yellow pigments (Aiarylide yellow, Arylide yellow, Hansa yellow, Benzidine yellow, etc.), organic orange pigments (Perinone orange, diarylide orange, etc.), organic blue pigments (Ultramarine blue, Indanthrone blue, etc.), organic red pigments (Anthraquinoid red, Perylene red, etc.) or organic pigments of other colors.

This embodiment also provides an electrophoretic display device, which includes a body of the electrophoretic display device, an electrophoretic solution disposed in the body of the electrophoretic display device, and the pigment particles described above.

In a preferred embodiment, the body of the electrophoretic display device is a microcapsule, a microcup or a micropool.

In this embodiment, the surface-modified pigment particles 1-4 with grafted polymers were prepared according to the following preparation method.

In a 1000 ml reaction bottle, 200 g of pigment particles was mixed with a certain amount of coupling agent, 200 g of lauryl ester, and 400 g of toluene. The system was kept inert under a nitrogen atmosphere, and mixed at a stirring speed of 200 rpm for 20 minutes. Under a nitrogen environment and a condensing reflux device, the temperature of the reaction mixture was slowly raised to 50° C., certain amount of initiator was added, and the reaction was carried out for 16 hours. The reaction product was collected by centrifugation at 3500 RPM, and the product was rinsed with toluene during collection. Afterwards, the electrophoretic particles were collected. Table 1 lists the organic content of the surface-modified pigment particles, the available testing data, and the calculated organic specific content over the unit surface area $W_{surf}$ of the pigment particles.

TABLE 1

| Sample name | Pigment particle | Color | Supplier | Specific surface area ($m^2/g$) | Organic content | Organic matter content per unit mass of pigment | Organic matter content per unit specific surface area ($g/m^2$) |
|---|---|---|---|---|---|---|---|
| Particle 1 | 20F944 | Black | Shepherd Color Co. | 22 | 17.07% | 20.58% | 0.936% |
| Particle 2 | 20C920 | Black | Shepherd Color Co. | 11 | 5.97% | 6.35% | 0.577% |
| Particle 3 | Ti-Pure 105 | White | Du Pont | 9 | 4.26% | 4.45% | 0.494% |
| Particle 4 | RO4597 | Red | Elementis | 7.5 | 4.58% | 4.80% | 0.640% |

Using the particles 1-4 obtained above, electrophoretic display samples 1-3 are prepared according to the preparation method as follows:

Electrophoretic solution preparation: An electrophoretic solution was obtained by dispersing a combination of an appropriate amount of the above collected white negatively charged electrophoretic particles and the above collected black neutrally charged electrophoretic particles, or the above collected white negatively charged electrophoretic particles and the above collected red positively charged electrophoretic particles, a stabilizer and a charge control agent in an alkane solvent, mixing the electrophoretic display solution properly, and keeping the solution at a certain temperature.

Synthesis of electrophoretic microcapsules through coacervation method: in a 10 L jacketed glass reactor, it was added a certain amount of deionized water, then a certain amount of gelatin was weighed and dissolved in deionized water with stirring at a temperature of 42° C. At the same time, a certain amount of acacia gum and deionized water were weighed, acacia gum was dissolved in deionized water in another 4 L glass container at a temperature of 40° C. After the gelatin was completely dissolved, the above prepared electrophoretic solution was added into the gelation solution, and then the rotation speed of the reactor was adjusted, and kept stirring for 45 minutes. Then the completely dissolved gum arabic solution was added into the reactor, was further adjusted to the appropriate rotation speed and continued to stir for 30 minutes. Then pH value of the reaction was adjusted to 4.5 with a 10% acetic acid aqueous solution, and the reaction was adjusted to the appropriate speed and kept stirring for another 30 minutes. The temperature of the reaction was then reduced to 10° C., and the temperature reduction time was controlled in 3 hours. A 50% glutaraldehyde solution was added, and the reaction temperature was raised to 25° C. for 10 hours to crosslink and cure the microcapsules. The microcapsules were collected by using a vibrating sieve method to obtain microcapsules with an appropriate average particle size.

Coating of microcapsule and preparation of electrophoretic display device: in a container, the pH value of the above collected microcapsules was adjusted to about 5.0, then it was mixed with 5 parts by weight of adhesive, 45 parts by weight of microcapsules, and 50 parts by weight of water, and the mixture was stirred. The dispersant and thickener were added and stirred at 45° C. to prepare an electronic ink. The electronic ink was coated on an ITO film and dried to form an electrophoretic display layer. The thickness of the tested electrophoretic display layer was 28 microns. Finally, a layer of glue was coated on the electrophoretic display layer, laser-cut to a suitable size, and then laminated to a TFT film. Thereby, an electrophoretic display device was ready to be tested for optical performance.

The prepared electrophoretic display devices were measured the optical performance at a specific temperature by using a color measuring instrument an X-rite i-1. The optical properties of samples 1-3 are shown in Table 2.

TABLE 2

| Sample name | White particles | Color particles | L* White | L* Black | a* Color | b* Color | CR |
|---|---|---|---|---|---|---|---|
| Sample 1 | Particle 3 | Particle 1 | 73.63 | 11.59 | 0.13 | −2.24 | 34.29 |
| Sample 2 | Particle 3 | Particle 2 | 75.45 | 16.45 | −0.16 | 0.04 | 22.40 |
| Sample 3 | Particle 3 | Particle 4 | 70.63 | 43.67 | 31.37 | 15.68 | 3.06 |

It can be seen from the data of Table 1 and Table 2, all the prepared samples have good optical performance. Among them, the black-and-white display effect of the black and white samples of samples 1 and 2 is very good, the contrast ratio meets the requirements, and the red and white samples of display 3 have good color. It shows that the sample obtained by reasonable range of the $W_{surf}$ value in this embodiment has good optical performance. At the same time, the pigment particles prepared in this embodiment also have good stability when dispersed in a solution.

The above description is only the preferred embodiments of the invention, and thus does not limit the patent scope of the invention. Any equivalent structure or equivalent process transformation made by using the description and drawings of the invention, or directly or indirectly used in other related technical fields, is also included in the patent protection scope of the invention.

What is claimed is:

1. An electrophoretic display device, comprising
a body of the electrophoretic display device,
an electrophoretic solution disposed in the body of the electrophoretic display device, and
a plurality of surface-modified pigment particles, adapted to reduce the van der Waals force and electrostatic attraction between the particles, and increase the dispersion and stability of the pigment particles in the electrophoretic solution;
wherein the electrophoretic solution comprises chemicals in an alkane solvent, said chemicals comprise
a plurality of negatively charged surface-modified pigment particles, another plurality of neutral surface-modified pigment particles, a stabilizer and a charge control agent; or
a plurality of negatively charged surface-modified pigment particles, another plurality of positively charged surface-modified pigment particles, a stabilizer and a charge control agent;
wherein each of the plurality of pigment particles comprises
a pigment particle and an organic modification layer formed on a surface of the pigment particle, wherein a thickness of the organic modification layer is between 20 nm and 100 nm;
the organic modification layer is a surfactant layer or a polymer material layer formed on the surface of the pigment particle;
each of the plurality of pigment particles is characterized by $W_{surf}$, in a range of 0.1-2% g/m², and
$W_{surf}$ is expressed as that:

$$W_{surf} = \left(\frac{\text{Organic matter quality}}{\text{Pigment particle quality}}\right) \Big/ \text{Specific surface area of pigment particles.}$$

2. The electrophoretic display device according to claim 1, wherein a thickness of the organic modification layer is between 35 nm and 50 nm.

3. The electrophoretic display device according to claim 1, wherein a shape of the pigment particles is irregular.

4. The electrophoretic display device according to claim 1, wherein a particle size of the pigment particles is in a range of 0.1 μm to 1 μm.

5. The electrophoretic display device according to claim 1, wherein the organic matter content over $W_{surf}$ of the specific surface area $W_{surf}$ of the pigment particles is further in the range of 0.25-1.6% g/m².

6. The electrophoretic display device according to claim 1, wherein the pigment particles are inorganic salts and/or inorganic oxide pigments.

7. The electrophoretic display device according to claim 1, wherein the organic modification layer is a surfactant layer or a polymer material layer adsorbed on the surface of the pigment particles, or the organic modification layer is a polymer material layer grafted on the surface of the pigment particles.

8. The electrophoretic display device according to claim 1, wherein the body of the electrophoretic display device is a microcapsule, a microcup or a micropool.

* * * * *